United States Patent [19]
Staley et al.

[11] Patent Number: 4,510,164
[45] Date of Patent: Apr. 9, 1985

[54] PROCESS FOR PRODUCING INTERMEDIATE MOISTURE QUICK-COOKING BEANS

[75] Inventors: Lorie L. Staley, Baltimore, Md.; Joaquin Pelaez, Plymouth, Minn.

[73] Assignee: McCormick & Company, Inc., Hunt Valley, Md.

[21] Appl. No.: 530,058

[22] Filed: Sep. 7, 1983

[51] Int. Cl.³ ............................................. A23L 1/20
[52] U.S. Cl. .................................. 426/331; 426/629; 426/634
[58] Field of Search ............... 426/629, 634, 331, 324

[56] References Cited

U.S. PATENT DOCUMENTS

| | | | |
|---|---|---|---|
| 3,318,708 | 5/1967 | Rockland | 426/634 |
| 3,595,681 | 7/1971 | Kaplow et al. | 426/331 |
| 4,273,796 | 6/1981 | Maxcy et al. | 426/331 |

OTHER PUBLICATIONS

Asahimatsu, European Patent Application, publication No. 0079686, May 25, 1983.

Primary Examiner—George Yeung
Attorney, Agent, or Firm—Cushman, Darby & Cushman

[57] ABSTRACT

Process for producing storage stable beans from edible dried beans comprises heating said dried beans, under pressure, in a humectant solution comprising an aqueous solution containing 4.5–7.5 weight percent of a sugar or polyglycol, 4.0–9.0 weight percent of a salt, 2.0–3.0 weight percent propylene glycol and 0.3–0.6 weight percent potassium sorbate for a period of time sufficient to increase the moisture level of said beans to about 50–60 percent. Thereafter the moisture level of the beans is reduced in a drying apparatus from about 50% to an intermediate moisture level of about 30–40 percent. The resulting intermediate moisture level beans are then packaged in a low value vapor transmission container. The beans produced in accordance with the process of this invention are quickly reconstituted, have excellent texture, and have the flavor of home cooked beans.

4 Claims, No Drawings

PROCESS FOR PRODUCING INTERMEDIATE MOISTURE QUICK-COOKING BEANS

The present invention relates to a process for producing fully cooked storage stable beans from edible dried beans. The present storage stable beans are capable of being rapidly and easily reconstituted, i.e., quickly prepared.

BACKGROUND OF THE INVENTION

Conventional methods for preparing dried beans require a relatively lengthy food preparation time prior to the bean being ready to consume. Efforts to overcome this disadvantage have included soaking beans in water with an optional pre-cook step followed by drying the beans, and packaging them for re-sale. Unfortunately, such attempts do not produce a totally acceptable food product.

Already known commercially available forms of beans suffer from several drawbacks. The three most well-known bean products are canned or retorted beans, dried beans or pre-cooked dried beans. All have certain significant disadvantages. While canned or retorted beans may require only five minutes of heating by the consumer, they lack desirable organoleptic qualities such as the flavor of freshly cooked beans. On the other hand, dried beans require an extensive preparation time: half-hour parboiling, then 8-16 hours of soaking and 1 hour cooking time. One commercially known compromise, pre-cooked beans, still requires about about 30 to 40 minutes of cooking. Unfortunately pre-cooked beans are usually cracked and also exhibit many splits and butterfly beans.

Further efforts to produce commercially packaged dried beans such as lima beans, pinto beans, navy beans, Great Northern beans, blackeye peas, lentils and soybeans are described in U.S. Pat. No. 3,318,708. As described therein, the dried beans are hydrated in accordance with specific procedures employing a particular aqueous hydrating medium and then dried. The hydration procedure requires placing the dried beans into a vacuum vessel in the presence of the hydrating medium (about 2.5-5 times the weight of the beans), and repeatedly applying and releasing the vacuum for an extended period of time. The hydrating medium contains sodium chloride and a chlorating agent. Subsequent to the hydration, the beans are dried to between 9.5 to 10.5 percent by weight moisture content. Such beans are alleged to be quick-cooking.

Another attempt is disclosed in U.S. Pat. No. 3,635,728, wherein the preparation of quick-cooking soybean products includes a brief boiling stage for about 0.5 to 2 minutes, followed by soaking the beans in a special hydration solution, and finally drying the beans. The beans are soaked for about 24 hours in a solution containing a salt, a chelating agent and optionally additional agents including a surface-active agent such as poyoxyethylene sorbitan palmitate and an antimicrobal agent such as sodium sorbate. The thus soaked beans are then dried to about a 10% moisture content.

U.S. Pat. No. 3,595,681 describes a shelf stable semi-moist food product of meats, fruits and vegetables. Cooked fruits and vegetables are initially dehydrated to a moisture content of 3-7% and in a separate step are subsequently rehydrated in an excess amount of solution containing at least 5% of a polyhydric alcohol, salt, water, propylene glycol and potassium sorbate, until the moisture content of the beans is in the range of 20-40%. The product is then packaged as is.

Salts employed in a special rehydrating medium may provide tenderization or promote flavor qualities in the final product while providing little realistic stability. In addition, most of these processes require relatively low and, in some cases, minimal final product moisture contents in order to achieve some form of product stability and shelf-life, i.e., non-deterioration. Unfortunately, the low moisture content is achieved at the expense of desirable food product texture. A further disadvantage of commercial significance is still a relatively long reconstituting time, i.e., food preparation time.

The present invention essentially overcomes these and other disadvantages associated with the production of known bean products.

Therefore, an object of the present invention is to produce a shelf-stable pre-cooked partially hydrated bean food product without canning or retorting.

An additional object is to provide a process for producing an intermediate moisture quick-cook bean product requiring 15 minutes or less for the consumer to prepare.

Yet another object is to provide a process which produces intermediate moisture quick-cook beans having uniform cooked texture without splits or butterflies.

Other objects and features of the present invention will become more apparent to those skilled in the art upon consideration of the following more detailed description and appended claims.

DETAILED DESCRIPTION OF THE INVENTION

The process of the present invention for preparing quick-cooking beans is broadly described as heating dried beans under pressure in a humectant solution comprising an aqueous solution containing: (i) 4.5-7.5 weight percent of a sugar or polygycol, such as corn syrup, fructose, glycerol, mannitol, sucrose sorbitol, (ii) 4.0-9 weight percent of a salt, e.g. sodium chloride or potassium chloride, (iii) 2.0-3.0 weight percent propylene glycol and (iv) 0.3-0.6 weight percent potassium sorbate for a period of time sufficient to increase the moisture level of said beans to about 50-60 percent; reducing the moisture level from 50-60% to an intermediate level of about 30-40 percent; and packaging the resulting intermediate moisture level beans in a low value vapor transmission container.

In the process of the present invention the beans are heated in the humectant solution for a period of time ranging from about 1½ hours to about 4 hours, at a temperature ranging from about 100° C. to about 140° C. and under a pressure ranging from about 15 to about 50 psi.

Following this heating treatment the beans are cooled and dried to a moisture content of from about 50 weight percent to about 40 to 30 weight percent moisture in conventional apparatus. This drying operation yields a moisturized bean having a water activity of about 0.75 to about 0.85. The resulting dried beans are then packaged in a low vapor transmission container.

Significantly, the present process and resulting products possess advantages not associated with the heretofore known and described processed beans. For instance the processed beans produced in accordance with either U.S. Pat. No. 3,318,708 or 3,635,728 must, in practice, be dehydrated to less than 20% moisture to obtain some degree of product stability. The present invention is not so limited and contemplates, for instance, drying to an about 30 to 40 percent moisture content. The beans prepared in accordance with the present invention will also reconstitute more rapidly than such previously known products and exhibit a better texture.

The following non-limiting examples illustrate the present invention.

EXAMPLE I

Intermediate moisture level quick-cooking beans are prepared in the following manner:

Navy beans, are heated in a sufficient humectant solution containing: 4.5–7.5% sorbitol; 4.5–9% sodium chloride; 2.0–3.0% propylene glycol; 0.3–0.6% potassium sorbate, the balance being water.

The beans are heated in this humectant solution for $2\frac{1}{4}$ hours at 30 psi at about 250° F. After heating, the beans are dried from about 50 weight percent moisture to about 30–40 weight percent moisture. The thus partially dehydrated beans have a water activity of 0.75 to 0.85.

The beans are packaged in a low water vapor transmission container. The beans are reconstituted in boiling water in about 10 to 20 minutes and exhibit highly acceptable texture.

EXAMPLE II

Pinto beans are heated in sufficient humectant solution containing: 4.0–6.0% glycerol, 4.0–6.0% sodium chloride, 2.0–3.0% propylene glycol and 0.3–0.6% potassium sorbate, the balance being water.

The beans are heated in this humectant solution for 4 hours at 212° F. After heating, the beans are drained and are dried from about 50 percent moisture to about 30–40 percent moisture. The final beans have a water activity of 0.75 to 0.85.

The beans are packaged in a low water vapor transmission container. The beans are reconstituted in boiling water in about 10–20 minutes and exhibit highly acceptable texture.

EXAMPLE III

Pinto beans are heated in sufficient humectant solution containing: 4.0–6.0% sodium lactate, 7.0 to 9.0% sodium chloride, 2.0–3.0% propylene glycol, and 0.3–0.6% potassium sorbate. The balance being water.

The beans are heated in this humectant solution for $2\frac{1}{4}$ hours at 30 psi. After heating, the beans are cooled and drained and are dried from about 50–60% moisture to about 30–40% moisture. The final beans have a water activity of 0.75 to 0.85.

The beans are packaged in a low water vapor transmission container. The beans are reconstituted in boiling water in about 10–20 minutes and exhibit highly acceptable texture.

It should be recognized that in the aforegoing examples other similar types of beans may be employed with similar advantageous results.

What we claim is:

1. A process for producing intermediate moisture quick-cooking and storage-stable whole beans comprising:

heating dried beans under about 15 psi to about 50 psi of pressure in the presence of a humectant solution comprising an aqueous solution containing 4.0–7.5 weight percent of a sugar or polyglycol, 4.0–9.0 weight percent of a salt, 2.0–3.0 weight percent propylene glycol and 0.3–0.6 weight percent potassium sorbate, for a period of time ranging from about 1.5 to about 4.0 hours at a temperature ranging from about 100° C. to about 140° C., to thereby increase the moisture level of said beans to about 50–60 percent;

reducing the moisture level of said beans from about 50–60% to an intermediate level of about 30–40 percent; and packaging the resulting intermediate moisture level whole beans in a low value vapor transmission container.

2. Process according to claim 1, wherein said salt is a mono-valent edible metal salt.

3. Process according to claim 2, wherein said salt is sodium chloride.

4. Quick-cooking and storage beans produced in accordance with the process of claim 1.

* * * * *